Figure 1:
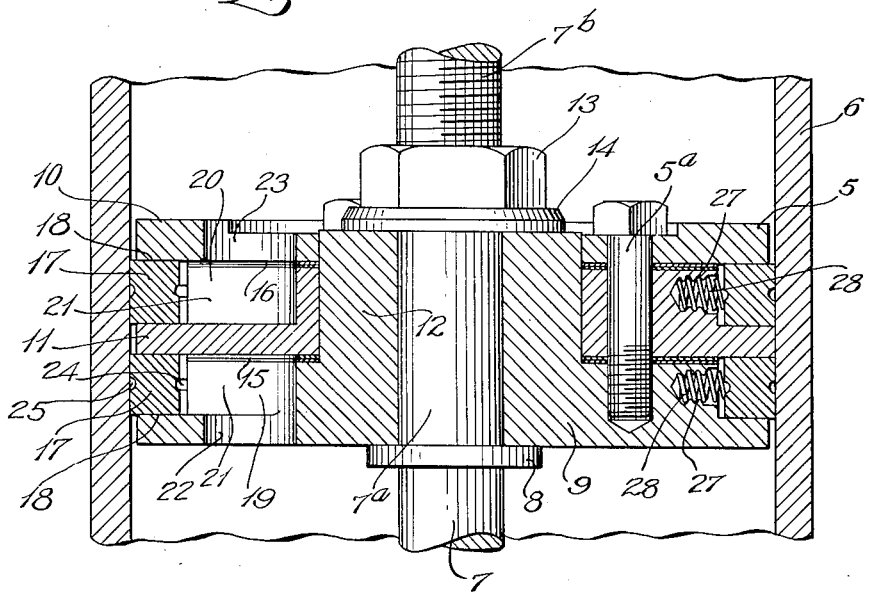

Nov. 7, 1933.  W. B. TOWELL  1,933,943

PISTON CONSTRUCTION

Filed Feb. 11, 1932

INVENTOR.
WILLIAM B. TOWELL
BY
ATTORNEY

Patented Nov. 7, 1933

1,933,943

UNITED STATES PATENT OFFICE 1,933,943

PISTON CONSTRUCTION

William B. Towell, Jersey City, N. J.

Application February 11, 1932. Serial No. 592,314

3 Claims. (Cl. 309—31)

This invention relates to pistons used in connection with engines, pumps and similar apparatus; and the object of the invention is to provide a piston composed of separate, detachably connected parts, within and between which are formed the ring grooves of the piston in which the annular rings are adapted to be supported, and further to the provision of means between predetermined parts of the piston for taking up the wear of the rings in the grooves to maintain a snug fit of the rings in the grooves at all times; a further object being to provide a piston of the class described including a central body portion and independent end walls arranged at opposite ends of the body portion and partially forming the ring grooves therein, one of said end walls including a central tubular bearing portion upon which the body part of the piston is mounted, said end walls and central body being so fashioned as to provide openings exposed through opposite ends of the piston and into relatively large chambers formed in said piston body and exposed to the rings mounted in the ring grooves, the chambers being subdivided by radial ribs supporting springs in the outer surfaces thereof for engagement with the rings of the piston; and with these and other objects in view, the invention consists in a piston of the class and for the purpose specified, which is simple in construction, efficient in use, and which is constructed as hereinafter described and claimed.

Figure 2:
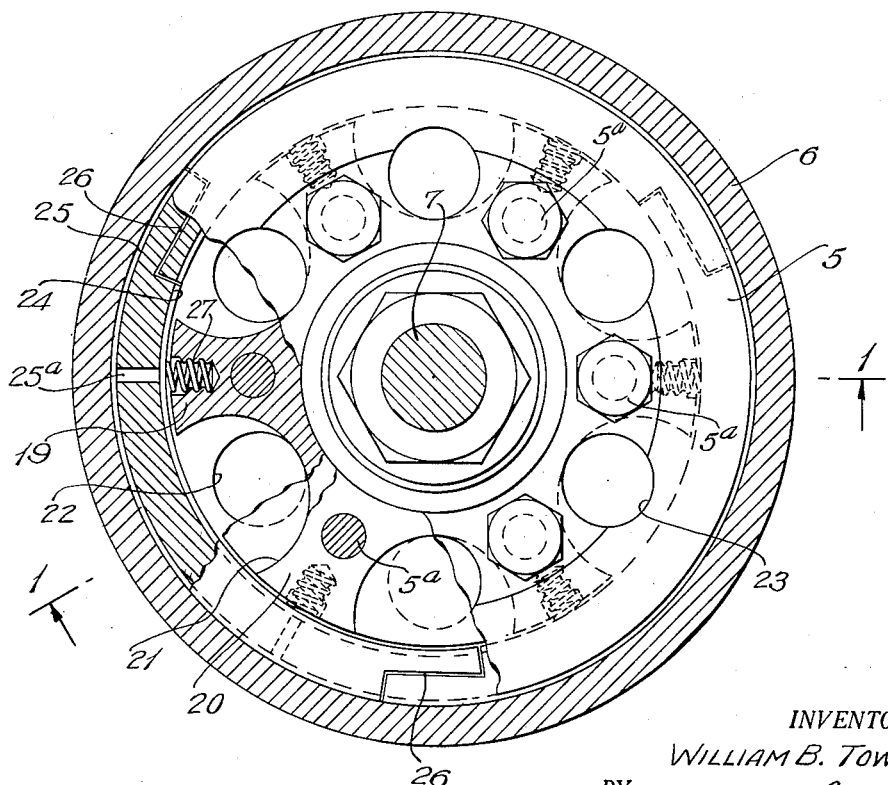

The invention is fully disclosed in the following specification, of which the accompanying drawing forms a part, in which the separate parts of my improvement are designated by suitable reference characters in each of the views, and in which:

Fig. 1 is a sectional view through a piston made according to my invention, indicating its arrangement in a cylinder, the section being on the broken line 1—1 of Fig. 2; and, Fig. 2 is a plan view of the piston arranged in the cylinder as seen in Fig. 1, the parts of the piston being broken away and in section.

In the accompanying drawing, I have shown for the purpose of illustrating one method of carrying my invention into effect, a piston 5 arranged in a cylinder 6. The piston is mounted on a rod 7 having an enlarged collar or flange 8. The piston is made up of three independent parts 9, 10, and 11, the parts 9 and 10 constituting end walls or plates for the piston. The part 9 includes a tubular bearing portion 12, upon which the parts 10 and 11 are mounted.

It is preferred that this tubular bearing portion be firmly secured or have a snug fit upon the part 7a of the rod 7 at one side of the collar 8, with the part 9 resting against said collar as shown, whereas the upper end of the portion 7a of the rod is threaded as seen at 7b to receive a nut 13. A washer 14 is preferably employed between the nut 13 and the tubular portion 12. This construction firmly secures the part 9 and tubular portion 12 upon the rod, whereas the parts 10 and 11 are secured together and to the part 9 by a plurality of screws 5a.

It will also be noted that shims 15 and 16 are placed between adjacent surfaces of the parts 9 and 11 and 10 and 11 respectively. Whenever desired, one or more of these shims may be removed in order to take up any play that may exist between the upper and lower surfaces of the sealing rings 17 and the corresponding surfaces of the parts 9—10 and the body part 11 which form the ring grooves 18 in the piston.

In the construction shown, the part 9 includes a plurality of outwardly and radially projecting ribs 19, six of which are employed in the construction shown and which are of the cross sectional contour illustrated in Fig. 2 of the drawing, and corresponding ribs 20 are formed on the upper surface of the part 11. The screws 5a pass through the top part or plate 10 and centrally through the ribs 20 and in threaded engagement with the ribs 19 for clamping the parts 10 and 11 to the part 9 as will be apparent. Relatively large chambers 21 are formed between the ribs 19 and 20, which chambers open outwardly into the ring grooves 18 and are exposed to the inner surfaces of the rings 17 mounted therein as will be apparent. The part 9 has large apertures 22 opening through the lower surface thereof and centrally into the chambers 21 formed between the ribs 19 and the parts 9 and 11 and similar apertures 23 are formed in the top part 10 and open outwardly therethrough and into the chambers 21 formed between the ribs 20 and the parts 10 and 11. It will therefore be seen that the prevailing pressure at opposite sides of the piston in the cylinder 6 may pass through the apertures 22 and 23 and into the chambers 21 so as to expose this pressure to substantially the entire inner surface of the rings to maintain said rings in engagement with the cylinder wall.

To relieve this outward pressure to a slight extent, I also provide the rings with inner and outer annular grooves 24 and 25 placed in communication with each other at intervals by radial ports 25a, note Fig. 2, so that the pressure may be introduced into the annular outer grooves 25 and onto the surfaces of the cylinder wall. It will also be noted that the rings 17 in the construction shown are made up in separate sections having overlapped joints as indicated at 26, note Fig. 2, the rings being composed of three sections in the construction shown.

The outer surfaces of the ribs 19 and 20 are exposed to the inner surfaces of the rings 17 and said ribs have screw threaded apertures 27, to receive and support coil springs 28 which operate in connection with the inner surfaces of the rings 17 to normally support said rings in engagement with the cylinder wall. The inner ends of the springs are in threaded engagement with the apertures 22 to prevent accidental displacement of the springs therefrom.

With my improved piston construction, it will be understood that I have materially simplified the formation of the ring grooves as well as the chambers 21 and apertures 22 and 23, both from a standpoint of casting or otherwise forming the separate parts of the piston, as well as from a standpoint of machining said parts. It will also be apparent that the several parts may be made with great care and accuracy, so as to provide the proper fitting of the rings within the ring grooves, especially with regard to the upper and lower surfaces of the rings and adjacent surfaces of the separate piston parts. By providing a number of shims 15 and 16 in the initial manufacture of the piston, it will be understood that as the upper and lower surfaces of the rings become worn, the piston parts may be adjusted by removing one or more shims to compensate for this wear, thus maintaining proper operating conditions at all times. In this connection, it will be understood that in separating the piston parts for adjustment and in replacing said parts, it is not essential to remove the part 9 from the rod 7, as the parts 10 and 11 alone may be removed by simply removing the screws 5a, which materially simplifies the assemblage of the rings and the parts 10 and 11 with respect to each other and the part 9.

It will be understood that while I have shown certain details of construction for carrying my invention into effect, that I am not necessarily limited to these details, and various changes in and modifications of the construction herein shown and described may be made within the scope of the appended claims without departing from the spirit of my invention or sacrificing its advantages.

Having fully described my invention, what I claim as new and desire to secure by Letters Patent, is:

1. The combination with a rod having an annular collar, of a piston composed of a plurality of independently formed parts arranged one upon the other, one of said parts seating on said annular collar and including a tubular portion firmly engaging said rod, means on the rod for retaining said part against displacement, screws passed through the other parts and into the first named part for securing the same together to permit attachment and detachment of the second named parts with respect to the first named part, said first named part and one of the second named parts including radial ribs forming at the outer ends thereof annular ring grooves between said piston parts and chambers between said ribs opening into said ring grooves, and the upper and lower piston parts including apertures opening into said chambers to expose the same to the prevailing pressure at opposite sides of the piston.

2. The combination with a rod having an annular collar, of a piston composed of a plurality of independently formed parts arranged one upon the other, one of said parts seating on said annular collar and including a tubular portion firmly engaging said rod, means on the rod for retaining said part against displacement, screws passed through the other parts and into the first named part for securing the same together to permit attachment and detachment of the second named parts with respect to the first named part, said first named part and one of the second named parts including radial ribs forming at the outer ends thereof annular ring grooves between said piston parts and chambers between said ribs opening into said ring grooves, the upper and lower piston parts including apertures opening into said chambers to expose the same to the prevailing pressure at opposite sides of the piston, and shims disposed between adjacent surfaces of the respective piston parts whereby the width of the ring grooves may be varied.

3. The combination with a rod having an annular collar, of a piston composed of a plurality of independently formed parts arranged one upon the other, one of said parts seating on said annular collar and including a tubular portion firmly engaging said rod, means on the rod for retaining said part against displacement, screws passed through the other parts and into the first named part for securing the same together to permit attachment and detachment of the second named parts with respect to the first named part, said first named part and one of the second named parts including radial ribs forming at the outer ends thereof annular ring grooves between said piston parts and chambers between said ribs opening into said ring grooves, and the upper and lower piston parts including apertures opening into said chambers to expose the same to the prevailing pressure at opposite sides of the piston, rings mounted in the ring groove the inner and outer surfaces of said rings having annular and circumferential recesses, and the rings being provided with radial ports placing said circumferential recesses in communication so as to expose the prevailing pressure in said chambers to the outer surface of said rings.

WILLIAM B. TOWELL.